(12) United States Patent
Farnsworth et al.

(10) Patent No.: US 6,582,132 B1
(45) Date of Patent: Jun. 24, 2003

(54) CONNECTOR PANEL MOUNT SYSTEM

(75) Inventors: Hilary Farnsworth, New Rochelle, NY (US); Igor Grois, Northbrook, IL (US); Jeffrey A. Matasek, Cedarburg, WI (US)

(73) Assignees: Molex Incorporated, Lisle, IL (US); Tellabs Operations, Inc., Lisle, IL (US)

( * ) Notice: Subject to any disclaimer, the term of this patent is extended or adjusted under 35 U.S.C. 154(b) by 0 days.

(21) Appl. No.: 09/568,518

(22) Filed: May 9, 2000

(51) Int. Cl.[7] ................................................ G02B 6/36
(52) U.S. Cl. ........................ 385/53; 385/135; 385/136; 439/557
(58) Field of Search ............................ 385/53 I, 55, 60, 385/147, 135, 136; 439/552, 555, 556, 557, 954

(56) References Cited

U.S. PATENT DOCUMENTS

| | | | |
|---|---|---|---|
| 5,214,735 A | | 5/1993 | Henneberger et al. ...... 385/136 |
| 5,613,876 A | * | 3/1997 | Sakatani et al. ............. 439/552 |
| 5,734,776 A | | 3/1998 | Puetz ........................... 385/134 |
| 5,757,997 A | * | 5/1998 | Birrell et al. .................. 385/60 |
| 5,779,500 A | * | 7/1998 | Tokuwa et al. .............. 439/557 |
| 5,800,208 A | * | 9/1998 | Ishiuzuka et al. ........... 439/557 |
| 5,949,946 A | | 9/1999 | Debortoli et al. ........... 385/134 |
| 6,089,909 A | * | 7/2000 | Tokuwa ...................... 439/557 |
| 6,123,579 A | * | 9/2000 | Ping ............................ 439/557 |
| 6,146,192 A | | 11/2000 | Cabalka et al. .......... 439/540.1 |
| 6,186,670 B1 | | 2/2001 | Austin et al. .................. 385/55 |
| 6,210,217 B1 | * | 4/2001 | Ping ............................ 439/557 |
| 6,241,551 B1 | * | 6/2001 | Watanabe .................... 439/557 |

* cited by examiner

Primary Examiner—Lynn D. Feild
Assistant Examiner—Thanh-Tam Le
(74) Attorney, Agent, or Firm—A. A. Tirva; Stacey E. Caldwell

(57) ABSTRACT

A connector panel mount system includes a panel having an opening defined at least in part by a first edge and a second edge remote from the first edge. A connector housing includes a recess for rigidly embracing the first edge of the opening in the panel, and a flexible latch for engaging the second edge of the opening in the panel.

7 Claims, 4 Drawing Sheets

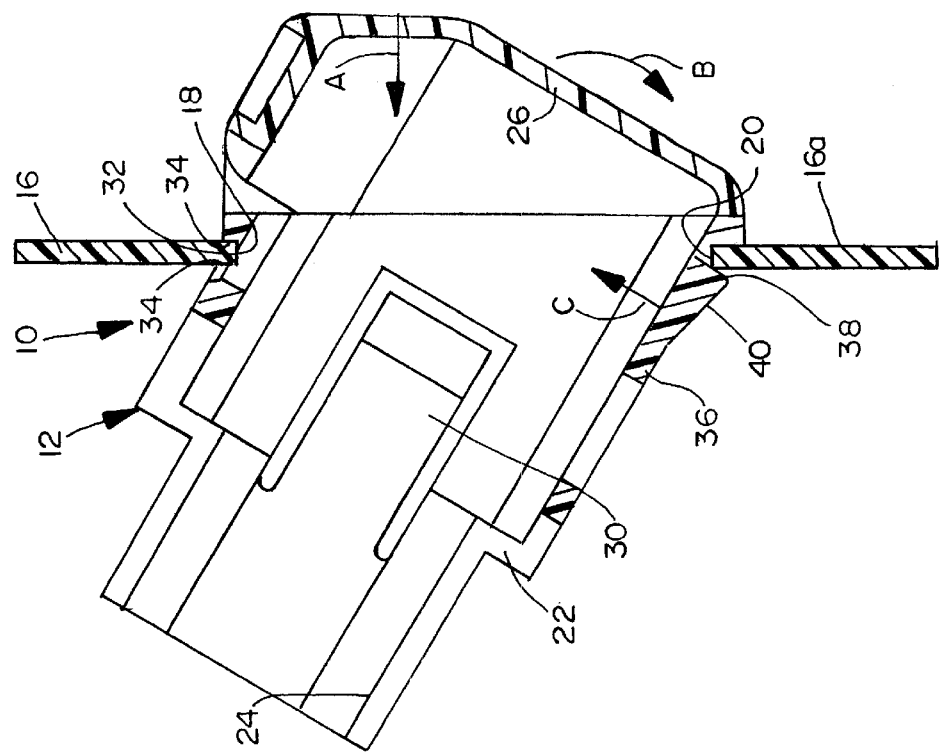
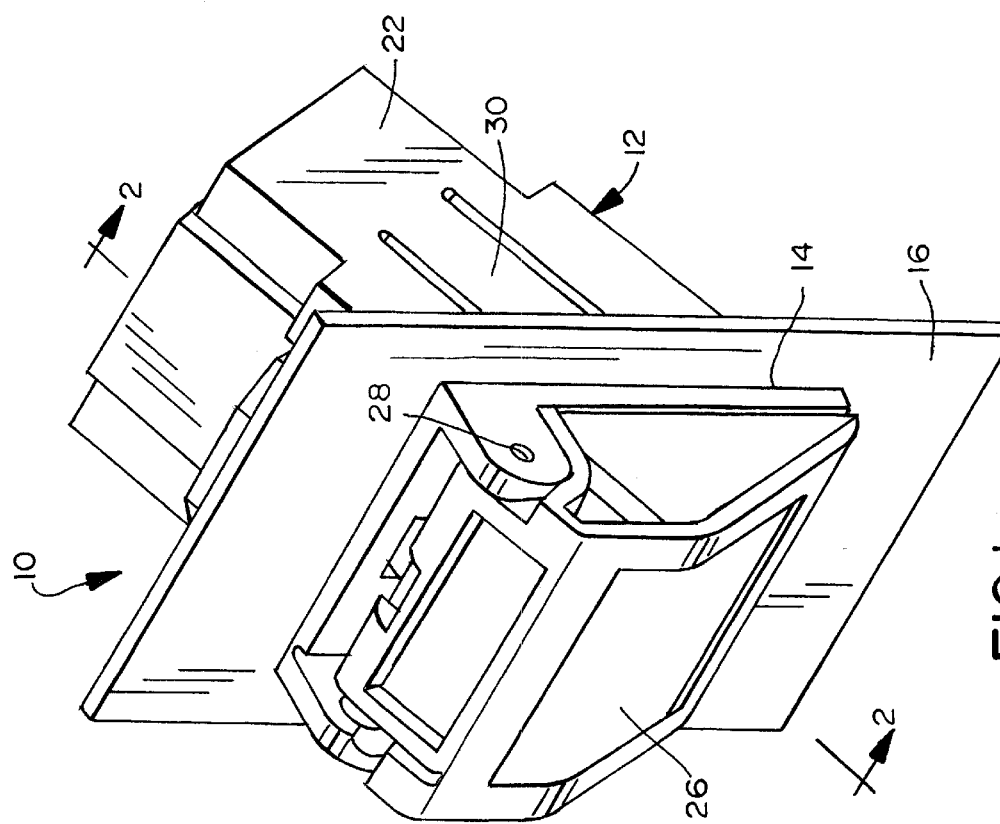

CONNECTOR PANEL MOUNT SYSTEM

FIELD OF THE INVENTION

This invention generally relates to the art of fiber optic connectors, electrical connectors and other such connecting devices and, particularly, to a system for mounting connectors in an opening in a panel, circuit board or other substrate.

BACKGROUND OF THE INVENTION

Fiber optic connectors, electrical connectors, adapters for such connectors and a variety of other such connecting devices often are mounted within openings in a panel. The connecting interface of the connector, therefore, passages through the panel, i.e., from one side of the panel to the other. The panel may be a drawer panel, a backplane panel, a circuit board or a variety of other planar substrates.

Problems continue to be encountered when mounting connectors within or through panels. On the one hand, it is desirable to rigidly secure the connector to the panel so that mating and unmating of complementary interengaging connecting devices do not dislodge the connector from the panel. Examples of such rigid or "permanent" mounting systems include the use of rivets, bolts, screws or other such fastening devices. Unfortunately, such systems do not allow for ready removal or release of the connector from the panel.

On the other hand, readily releasable mounting systems most often employ flexible latch arms which "snappingly" engage the connector within an opening in the panel. These flexible latches allow for ready removal or release of the connector from the panel. Unfortunately, the flexible latches are prone to breakage because of repeated or undue mating and unmating or other forces applied to the panel mounted connector.

The present invention is directed to solving these problems or the dilemma described above, by providing a connector panel mount system which rigidly secures the connector to the panel for countering forces applied thereto and still releasably latching the connector to the panel by a flexible latch means.

SUMMARY OF THE INVENTION

An object, therefore, of the invention is to provide a new and improved connector panel mount system of the character described.

In the exemplary embodiment of the invention, the system includes a panel having an opening defined at least in part by a first edge and a second edge remote from the first edge. A connector housing includes a recess for rigidly embracing the first edge of the opening in the panel, and a flexible latch for engaging the second edge of the opening in the panel.

As disclosed herein, the recess is provided as an elongated groove for receiving the first edge of the opening in the panel. The groove has opposite side walls for engaging opposite sides of the panel. The flexible latch is provided in the form of a flexible latch arm having a latch hook snappingly engageable with the second edge of the opening in the panel.

The connector housing and the opening in the panel are shown herein to be generally rectangularly shaped. The first and second edges are disposed on diametrically opposite sides of the opening. The flexible latch arm has a chamfered surface for engaging the second edge and automatically flexing the latch hook into latching engagement with the second edge after the groove is embraced with the first edge and the housing is rotated to a mounted position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of the connector panel mount system of the invention including a connector housing mounted through an opening in a panel;

FIG. 2 is a vertical section taken generally along line 2—2 of FIG. 1;

DETAILED DESCRIPTION OF THE PREFERRED EMBODIMENTS

Figure 3:
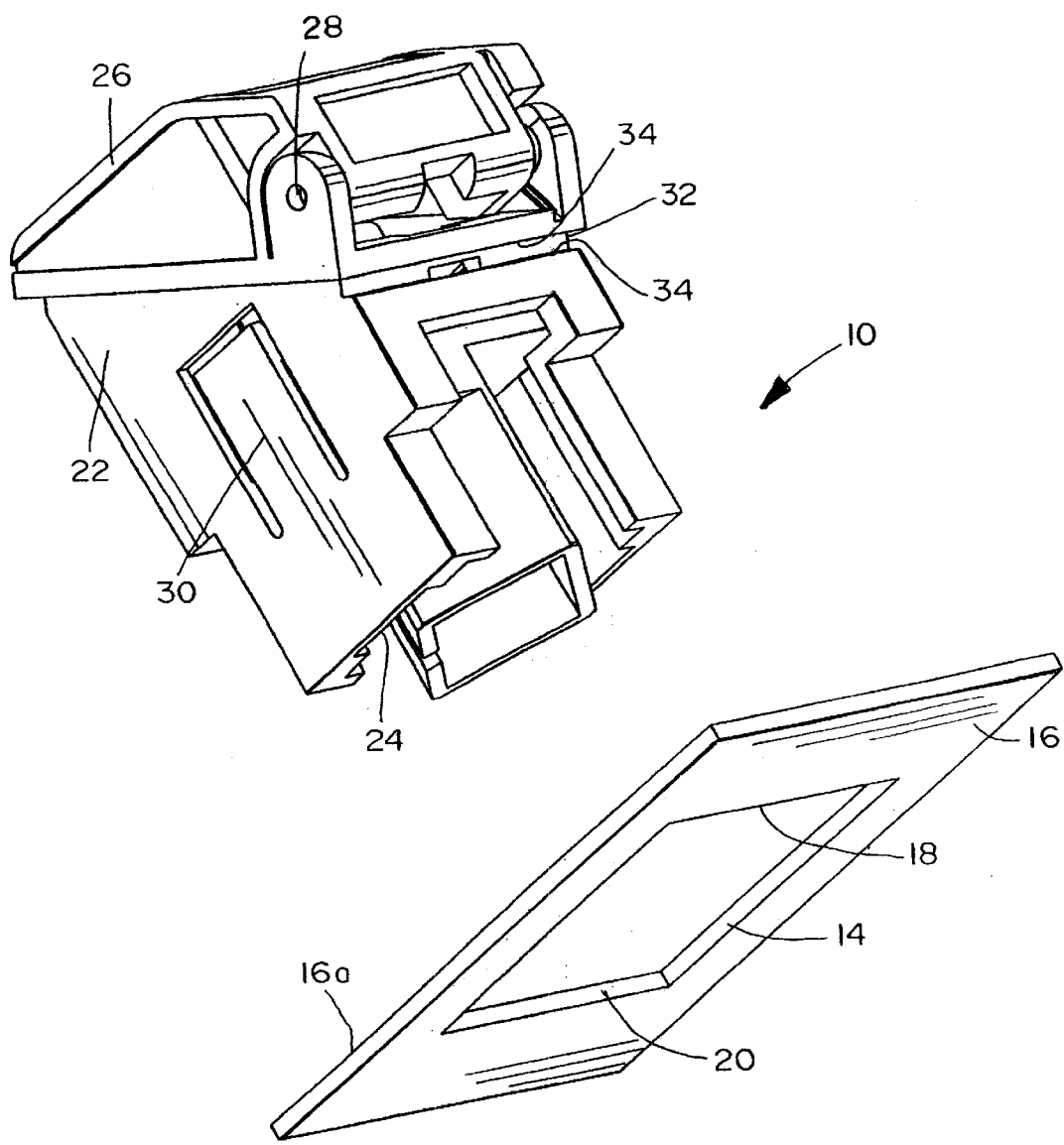
FIG. 3 is a top perspective view of the connector removed from the panel.

Referring to the drawings in greater detail, and first to FIGS. 1 and 2, the invention is embodied in a connector panel mount system, generally designated 10, for mounting a connector, generally designated 12, in or through an opening 14 in a panel 16. As seen in FIG. 2, the opening in panel 16 is defined at least in part by a first edge 18 and a second edge 20 remote from the first edge. As disclosed herein, the connector housing (described hereinafter) and the opening in the panel are generally square or rectangular, and first and second edges 18 and 20, respectively, are located on diametrically opposite sides of the opening as seen clearly in FIG. 2.

Connector 12 includes a housing 22 having an open receptacle 24 (FIG. 2) at one end and a shutter or door 26 at an opposite end. Connector housing 22 is mounted within the opening in panel 16 such that receptacle 24 and shutter 26 are located on opposite sides of the panel. The shutter is spring loaded and is pivoted to the housing, as at 28 (FIG. 1), so that the shutter is biased toward a closed position as shown in the drawings.

It should be understood that "connector" 12 is used herein in a generic sense, including the connector having a "connector housing" 22. The connector shown herein actually is sort of an adapter which can receive one connecting device through receptacle 24 and locked therein by a pair of flexible locking arms 30. Shutter 26 can be opened to allow a second or mating connecting device to be inserted into the adapter for mating with the connecting device inserted into receptacle 24. Therefore, the two connecting devices are mated within the adapter and through the opening in the panel, as the adapter mounts the entire connector assembly to the panel. However, it should be understood that the invention herein is equally applicable for a wide variety of "connectors" mountable within or through panels, such as fiber optic connectors, per se, electrical connectors, per se, and other such connecting devices. In other words, the connecting devices can be mounted directly to or through the panel by the connector panel mount system of the invention.

With that understanding, reference is made to FIG. 3 in conjunction with FIGS. 1 and 2, wherein it can be seen that connector housing 22 is provided with an elongated recess or groove 32 defining opposite side walls 34. This elongated groove 32 rigidly receives first edge 18 of opening 14 in panel 16 as seen in FIG. 2. Side walls 34 of the grooves are spaced slightly wider than the thickness of the panel so that edge 18 can be inserted into the groove, but the side walls embrace opposite sides of the panel to provide rigid reactionary interengaging surfaces to counteract undue forces applied to connector 12. In other words, the interengagement of first edge 18 of panel 16 within groove 32 of connector housing 22 absorb major forces interacting between connector 12 and panel 16.

Figure 4:
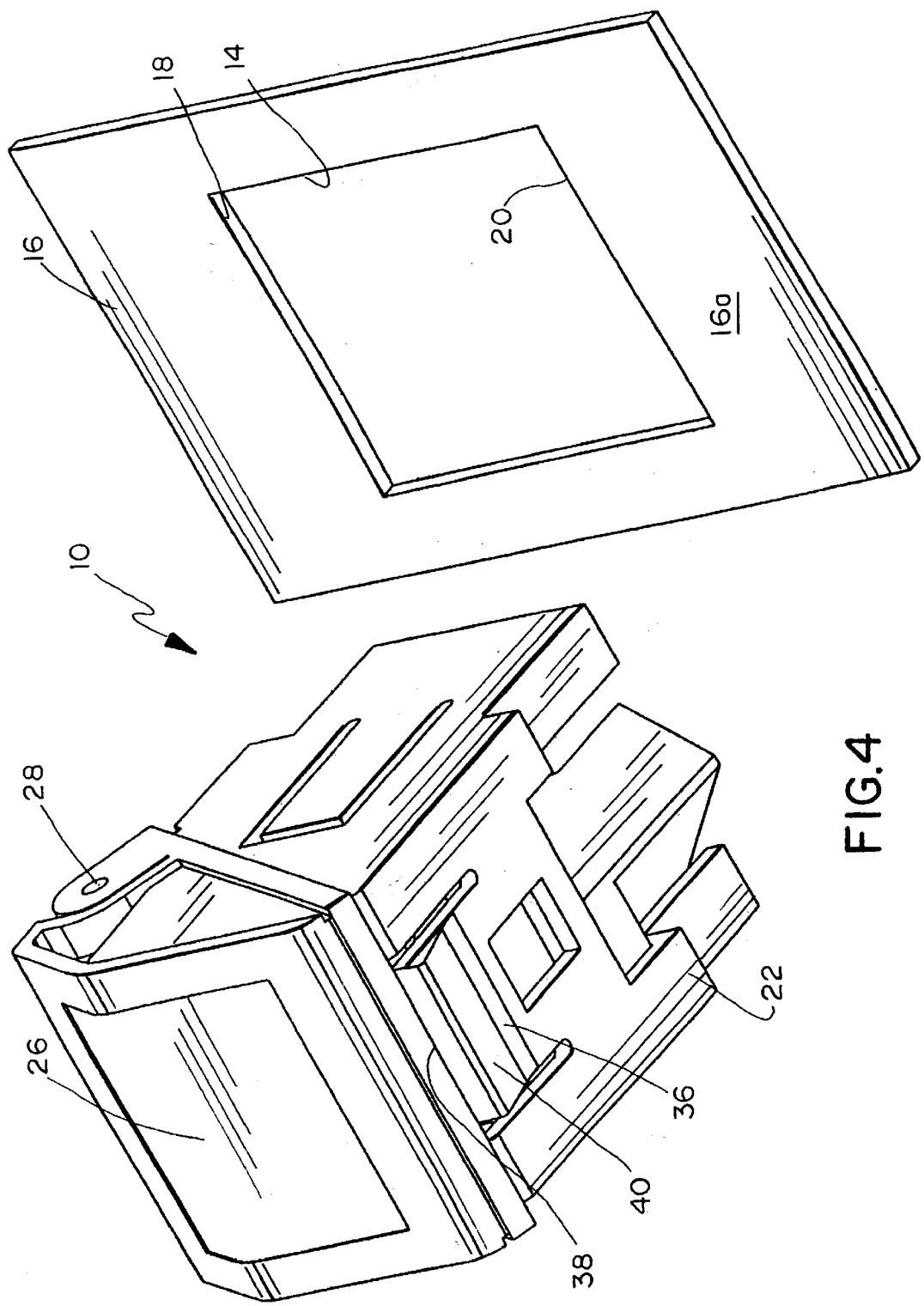
FIG. 4 is a bottom perspective view of the connector removed from the panel.

Referring to FIG. 4 in conjunction with FIGS. 1 and 2, a flexible latch arm 36 is formed integrally with connector housing 22 and includes a latch hook 38 for snappingly engaging second edge 20 of opening 14 in panel 16 to latch connector 12 in a mounted position within the panel as seen in FIGS. 1 and 2. Therefore, the flexible latch arm allows for ready removal or release of the connector from the panel. An outer surface 40 of the flexible latch arm is chamfered so that latch hook 38 is automatically flexed into latching engagement with second edge 20 when the connector is mounted within opening 14 of the panel, as described below.

The mounting of connector 12 through panel 16 will now be described, with principal reference to FIG. 2. Receptacle end 24 of the connector first is inserted through the opening in the panel in the direction of arrow "A" to a position whereat first edge 18 of the opening in the panel is seated rigidly within groove 32 of connector housing 22. The connector then is rotated about edge 18 in the direction of arrow "B" until chamfered surface 40 engages side 16a of the panel at second edge 20. This causes flexible latch arm 36 to be biased inwardly in the direction of arrow "C", until latch hook 38 clears edge 20, and the latch arm flexes back outwardly so that latch hook 38 latchingly holds the connector within the opening in the panel as shown clearly in FIG. 2. If it is desired to remove the connector from the panel, flexible latch arm 36 is pushed inwardly or upwardly in the direction of arrow "C" (FIG. 2), and the connector is rotated back out of the opening opposite the direction of arrow "B", as the interengagement of edge 18 of the panel within groove 32 acts as a fulcrum.

Figure 5:
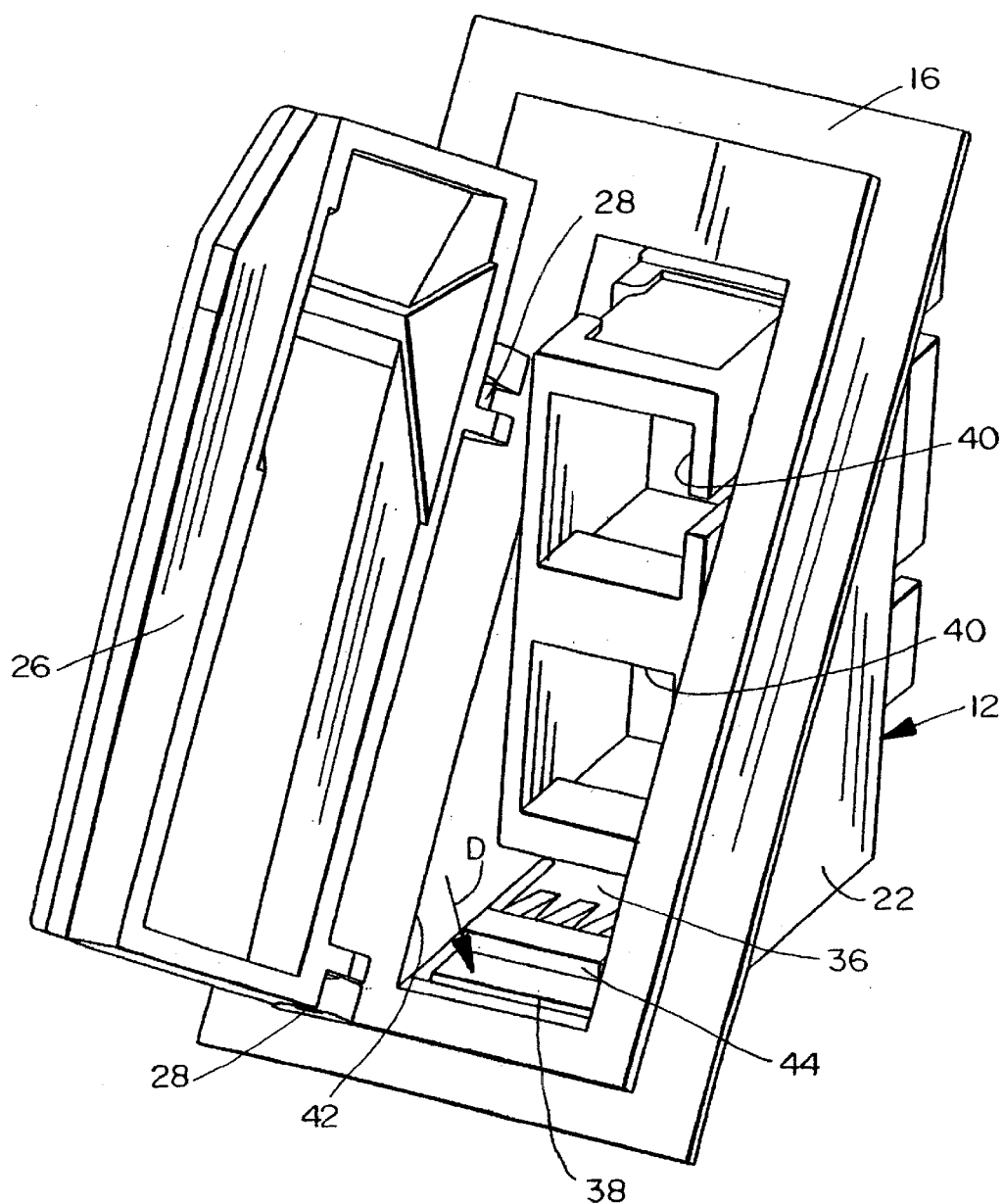
FIG. 5 is a perspective view of a second embodiment of the invention.

FIG. 5 shows an embodiment of the invention wherein like numerals have been applied corresponding to like components described above in relation to the embodiment of FIGS. 1–4. In the embodiment of FIG. 5, connector housing 22 includes a pair of interior receptacles 40 for receiving mating connecting devices through the panel when shutter 26 is open, as shown. The housing has a cavity 42 about receptacles 40, which is enlarged to allow for access to the inside of flexible latch arm 36. According to this embodiment, the latch arm has an interior ledge or shoulder 44 which is engageable by an appropriate tool to bias the latch arm outwardly in the direction of arrow "D" to disengage latch hook 38 from the panel opening. In other words, in the embodiment of FIGS. 1–4, the connector is released from the outside thereof as described in relation to FIG. 2, whereas the embodiment of FIG. 5 allows for release of the connector from the inside thereof. In comparing FIG. 2 with FIG. 5, it can be understood that the connector of FIG. 5, thereby, can be released from the opposite side of the panel, i.e., the side where shutter 26 is located.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A connector panel mount system, comprising:
   a panel having an openings defined at least in part by a first edge and a second edge remote from the first edge; and
   a connector receptacle including a housing having a recess for rigidly embracing said first edge of the opening in the panel, the housing having a flexible latch with a latch surface on one side of the opening in the panel for engaging said second edge of the opening in the panel, and the housing also including a cavity allowing access to the flexible latch through the opening rom the opposite side of the panel when the connector receptacle is completely inserted to the opening to permit release of the latch surface of the flexible latch.

2. The connector panel mount system of claim 1 wherein said recess comprises an elongated groove for receiving said first edge of the opening in the panel, the groove having opposite side walls for engaging opposite sides of the panel.

3. The connector panel mount system of claim 1 wherein said flexible latch comprises a flexible latch arm having a latch hook snappingly engageable with said second edge of the opening in the panel.

4. The connector panel mount system of claim 1 wherein said opening in the panel is polygonal in shape, and said first and second edges are on diametrically opposite sides of the opening.

5. The connector panel mount system of claim 1 wherein said flexible latch has a chamfered surface for engaging said second edge of the opening in the panel and automatically flexing the latch into latching engagement with the second edge after said recess is embraced with the first edge and the housing is rotated to a mounted position.

6. A connector panel mount system, comprising:
   a panel having a polygonal opening defined at least in part by first and second edges on diametrically opposite sides of the opening; and
   a connector receptacle including a housing having an elongated groove for receiving said first edge of the opening in the panel, the groove having opposite side walls for engaging opposite sides of the panel, a flexible latch arm on one side of the panel and having a latch hook snappingly engageable with said second edge of the opening in the panel, the latch arm having a chamfered surface for engaging said second edge and automatically flexing the latch hook into latching engagement with the second edge after said groove is embraced with the first edge and the housing is rotated to a mounted position, and the housing including a cavity allowing access to the flexible latch arm through the opening from the opposite side of the panel when the connector receptacle is completely inserted to the opening to permit release of the chamfered surface of the flexible latch.

7. A connector panel mount system, comprising:
   a panel having an opening defined at least in part by a first edge and a second edge remote from the first edge; and
   a connector receptacle including a housing having a recess for rigidly embracing said first edge of the opening in the panel and a flexible latch for engaging said second edge of the opening in the panel, the latch being formed out of an aperture in the housing which substantially surrounds the latch to protect the latch, and wherein said flexible latch with a latch surface within said aperture is located on one side of the opening in the panel and the latch is accessible through the opening and through the housing from the opposite side of the panel when the connector receptacle is completely inserted to the opening to permit release of the latch surface of the flexible latch.

* * * * *